United States Patent [19]

Carlnäs

[11] Patent Number: 4,719,816
[45] Date of Patent: Jan. 19, 1988

[54] DEVICE FOR POSITIONING AN ACTUATOR

[75] Inventor: Bengt E. Carlnäs, Gävle, Sweden

[73] Assignee: Rotell AB, Gavle, Sweden

[21] Appl. No.: 9,015

[22] PCT Filed: Dec. 8, 1983

[86] PCT No.: PCT/SE83/00438
§ 371 Date: Aug. 14, 1984
§ 102(e) Date: Aug. 14, 1984

[87] PCT Pub. No.: WO84/02405
PCT Pub. Date: Jun. 21, 1984

Related U.S. Application Data

[63] Continuation of Ser. No. 641,952, Aug. 14, 1984, abandoned.

[30] Foreign Application Priority Data

Dec. 14, 1982 [SE] Sweden .................. 8207138

[51] Int. Cl.4 .................. F16H 35/18; F16H 1/22
[52] U.S. Cl. .................. 74/625; 74/10.54;
74/89.15; 74/640; 74/665 D; 74/805
[58] Field of Search ............ 74/10.54, 89.15, 424.8 R,
74/424.8 A, 424.8 VA, 459, 625, 626, 640, 665
D, 804, 805; 318/592, 593

[56] References Cited

U.S. PATENT DOCUMENTS

| | | | |
|---|---|---|---|
| 2,367,492 | 1/1945 | Fickett et al. | 74/625 X |
| 2,404,116 | 7/1946 | Wolowicz et al. | 74/805 X |
| 2,541,529 | 2/1951 | McVicker | 74/625 |
| 2,798,992 | 7/1957 | Adler et al. | 318/593 |
| 3,028,513 | 4/1962 | Sundt | 74/804 X |
| 3,078,475 | 2/1963 | Turner | 74/625 X |
| 3,169,201 | 2/1965 | Spring et al. | 74/805 X |
| 3,306,123 | 2/1967 | Norbut et al. | 74/424.8 VA |
| 3,327,826 | 6/1967 | Henschke | 74/424.8 VA |
| 3,385,116 | 5/1968 | Carlson et al. | 74/10.54 |
| 3,647,038 | 3/1972 | Balz | 192/141 |
| 3,763,747 | 10/1973 | Beichel et al. | 74/424.8 R |
| 3,793,896 | 2/1974 | Price et al. | 74/89.15 |
| 4,019,616 | 4/1977 | Thorne | 74/89.15 |
| 4,046,241 | 9/1977 | Furtah, Jr. | 74/89.15 |
| 4,080,844 | 3/1978 | Killian | 74/424.8 A |
| 4,257,192 | 3/1981 | Bartholomew | 74/625 X |
| 4,371,360 | 2/1983 | Ojima et al. | 414/111 |
| 4,438,662 | 3/1984 | Walton et al. | 74/625 |
| 4,440,050 | 4/1984 | Kagerer | 74/625 X |

FOREIGN PATENT DOCUMENTS 21053 2/1983 Japan .................. 74/424.8 R
7109362-9 11/1975 Sweden .

Primary Examiner—Allan D. Herrmann
Attorney, Agent, or Firm—Burns, Doane, Swecker & Mathis

[57] ABSTRACT

A linearly reciprocable actuator is reciprocated by a mechanism which includes a rotatable part which is operably connected to the actuator to produce linear movement of the actuator in response to rotation of the rotatable part. A fine drive motor is operably connected to the rotatable part for rotating the rotatable part in a precisely controlled manner. The fine drive mechanism is operably disconnectable from the rotatable part to permit the latter to be rotatable independently of the fine drive motor. A coarse drive mechanism is connected to the rotatable part independently of the fine drive motor for rotating the rotatable part in a coarser manner than the fine drive motor when the fine drive motor is operably disconnected from the rotatable part.

4 Claims, 5 Drawing Figures

DEVICE FOR POSITIONING AN ACTUATOR

This application is a continuation of application Ser. No. 641,952, filed Aug. 14, 1984, now abandoned.

FIELD OF THE INVENTION

The present invention relates to a device for positioning of an actuator comprising a rotational part which is in engagement with the actuator for linear displacement of the latter when rotating the rotational part.

BACKGROUND OF THE INVENTION

Known such devices include either tapezoidal screw systems or ballscrew systems driven either fully manually or manually in combination with a motor as in several machine tools. In the last mentioned case the manual rotational motion is supplied by a separate shaft or spindle while th motor is set in engagement by an other spindle.

OBJECTS AND SUMMARY OF THE INVENTION

An object of this invention is to bring about a device in which the same spindle as is used for manual actuation can be used also for motorized actuation. From a functional point of view the manual motion should be considered as a fine or precision motion.

BRIEF DESCRIPTION OF DRAWING

The invention will be more particulary described in connection with the attached drawing, in which.

DETAILED DESCRIPTION OF THE PREFERRED EMBODIMENT

Figure 1:
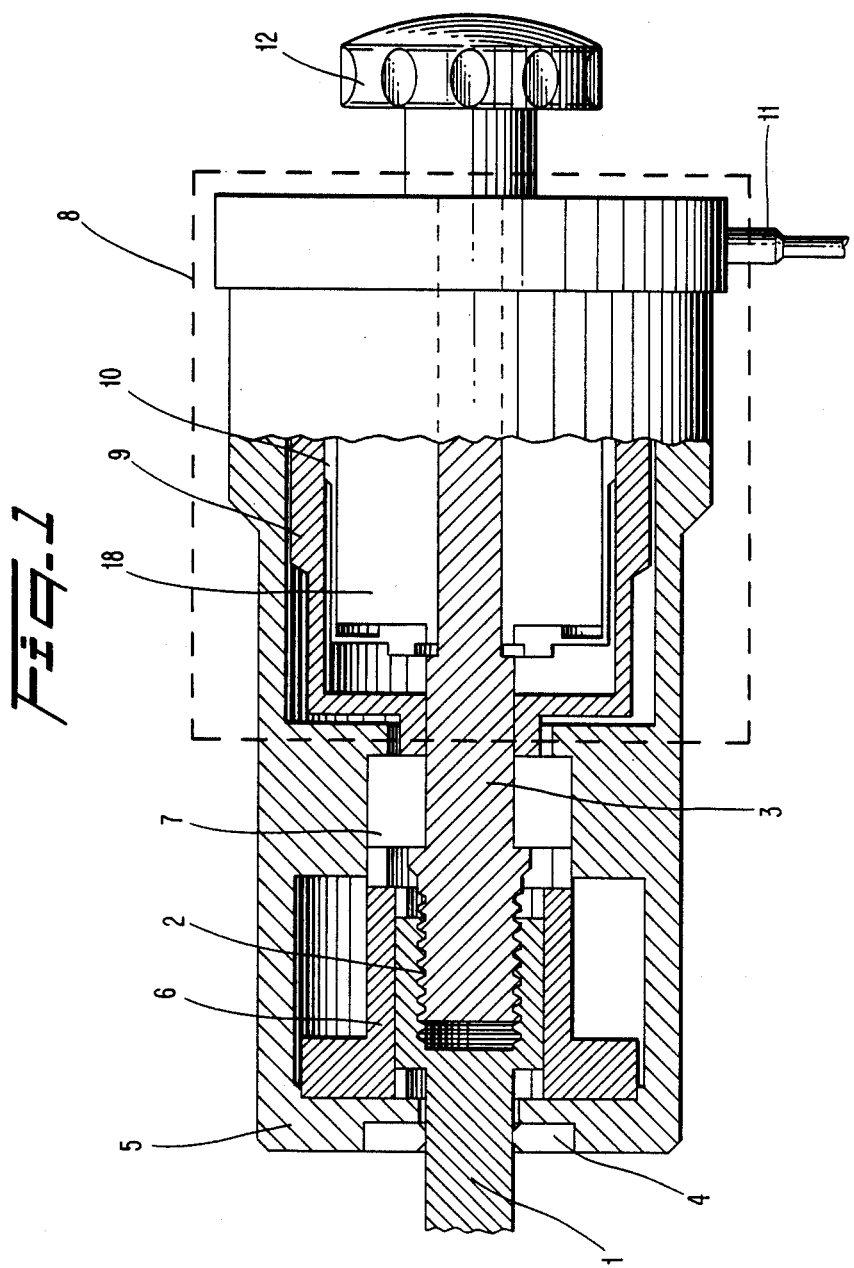
FIG. 1 is a partially cut away view of an embodiment of a positioning device according to the invention.

FIG. 1 shows an embodiment of the device according to the invention for positioning of an actuator which consists of a piston 1 with circular cross section. The piston 1 is intended to be connected at its free end to a not shown load for controlled linear displacement of this load. The other end of the piston 1 is sleeve-shaped and provided with an internal trapezoidal thread 2 in mesh with a tapezoidal thread of a rotational stationary spindle 3. The actuator piston 1 is supported by a guide bearing 4 in a housing 5 which also contains an element 6 not shown in detail, e.g. a spline set, to prevent the piston 1 from rotating when the spindle 3 is rotated. The spindle 3 is in turn rotationally supported by a bearing 7 in the housing 5.

Figure 4:
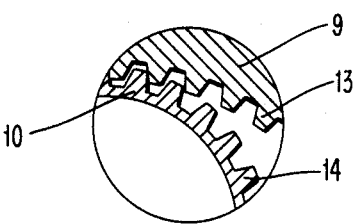
FIG. 4 is an isolated view of the encircled portion of FIG. 3.

According to the invention the spindle 3 constitutes the output spindle of a motor known per se, which in the embodiment shown is a fluid pressure controlled rotary stepping motor in accordance with Swedish Pat. No. 7109362-9. The stepping motor 8 is arranged in the housing 5 and consists of a rotor in the form of a rigid circular ring gear 9 with internal teeth 13, FIG. 4, a stator in the form of an elastic strain gear 10 oriented co-axially to the rotor with external teeth 14, FIG. 4. The two gears 9 and 10 have different numbers of teeth and are arranged to have the teeth fully meshed at diametrically located portions of the gears. An even number of force supplying elements 16 are uniformly distributed around the periphery of the elastic strain gear 10 to bring this gear into mesh with the rigid ring gear 9 to rotate the latter in a manner known per se. The fluid pressure is supplied to the motor 8 via an air or hydralic hose 11 from a pressure source not shown.

The rigid ring gear 9 is firmly connected to the spindle 3 which extends freely through the elastic strain gear and at its other end carries a wheel 12 by which the spindle 3 can be rotated when the elastic gear 10 is out of mesh with the rigid ring gear 9. When the wheel 12 is rotated, the rigid gear 9, i.e. the rotor of the motor, will of course also rotate. By means of the wheel 12 the spindle 3 can thus be rotated quickly by hand for coarse positioning of the position of the piston 1. For precision positioning or fine control of the position of the piston 1 the motor 8 will however be driven by fluid pressure from the pressure source not shown.

Figure 2:
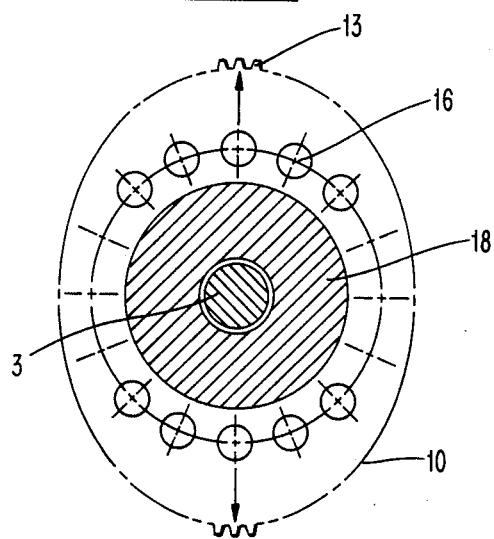
FIG. 2 is a schematic view showing the principle upon which the motor of the invention operates.
Figure 3:
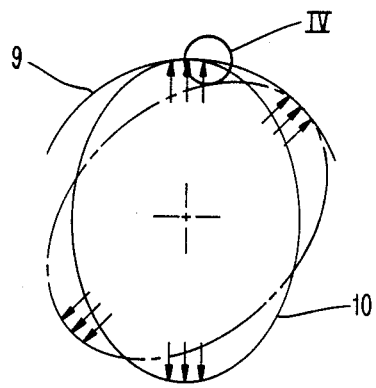
FIG. 3 is a schematic view showing the principle of FIG. 2.
Figure 5:
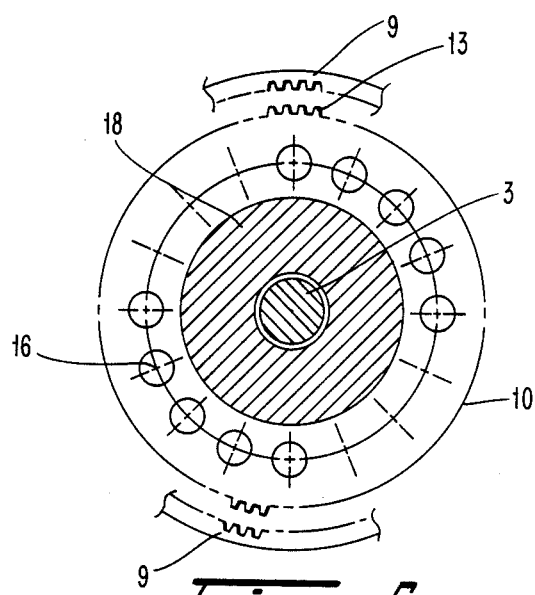
FIG. 5 is a schematic view showing the principle upon which the motor of the invention operates wherein the elastic stator of the motor is in a rest position.

The principle upon which the preferred motor operates is disclosed in the Swedish Patent mentioned above, and is shown in FIGS. 1–5, FIGS. 2–4 of which are also depicted and described in that patent. As disclosed in that patent, the principle includes deforming the periphery of the nonrotatable elastic stator gear 10 so that the teeth 14, shown in FIG. 4, of the gear 10 engage the teeth 13 of the rotor gear 9. Since the number of teeth on the gears 9 and 10 differs, the peripheral deformation of the gear 10 causes the teeth 14 to engage and transmit rotational drive to the gear 9 in proportion to the difference in the number of teeth of the gears. Prior to deformation of the gear 10 the teeth of the gear 10 do not contact the teeth 13 of the rotor gear 9. The gear 10 is shown schematically in this rest position in FIG. 5. As shown in FIG. 2, opposing power elements or force supplying elements 16 are pressurized to cause the deformation in the stator gear 10. These force supplying elements may be provided around a cage or retainer 18.

Of course the motor 8 does not have to be the one according to the Swedish patent mentioned above but can be any kind of stepping motor where the rotor and stator can be disengaged from each other to achieve coarse positioning of the actuator i.e. the piston 1. The coarse positioning does not have to be made by hand, but the wheel 12 can be replaced by a gear, a pulley or the like to render a coarse positioning possible by using a motor not shown. Moreover the piston 1 of course does not have to be provided with an internally threaded sleeve-shaped part, but this part can as well be provided on the spindle 3. In such a case that the sleeve-shaped part of the piston will be replaced by an externally threaded part such as a screw. It should be pointed out that the threads do not have to be of the trapezoid type but can also be of a ballscrew or rollerscrew type of transmission to transform rotating motion into linear motion. The advantage of trapezoid threads is that the actuator will be self-locking at not too high a pitch of the threads and that trapezoid threads are inexpensive construction elements. The advantage of using a ballscrew transmission is primarily that the low friction of such a transmission enables the actuator to position greater loads. Moreover it is possible to imagine cases where the part 3 is provided with two external treads having different pitches and perhaps even so that one is right-threaded and the other is left-threaded. Corresponding nuts having internal threads of the same pitch and shape as the two parts on the spindle 3 having external threads will then move on these parts of the spindle 3 as a differential screw transmission.

In order to compensate for any play or backlash in the gear transmission it is possible to divide the part of the piston 1 having an internal thread into two nuts which rigidly or by means of a spring (not shown) either are pressed together or apart from each other so that the backlash disappears.

For practical reasons it is supposed as is shown in FIG. 1 that the linear motion shall be restricted by mechanical stops. If for instance the spindle 3 rotates so that the piston 1 in FIG. 1 moves to the left this piston motion will be stopped when the piston 1 touches the housing 5.

Often it can be of value to sense the position of the actuator. The simpliest way to do that is to provide the device with an optical, electrical or mechanical rotational transducer attached to either the rotor 9 or the spindle 3. Of course the device can also be provided with a linear transducer which directly measures the linear position of the actuator 1.

A device according to the invention can be used with advantage for several applications where today purely manually operated actuators are used and where by using the device according to the invention the control systems of machines and equipments can be automated and improved as for instance actuators for screw jacks for nuclear reactors or actuators for the positioning of the slice lip of paper machines for the control of the weight profile.

What is claimed is:

1. Apparatus comprising:
   a linearly reciprocable actuator,
   a rotatable part operably connected to said actuator to produce linear movement of said actuator in response to rotation of said rotatable part,
   fine drive means comprising a stepping motor and being operably connectable to said rotatable part for rotating said rotatable part with precision movement, said fine drive means being disconnectable from said rotatable part to permit the latter to be rotatable independently of said fine drive means, said stepping motor including a drive gear and a driven gear having different numbers of teeth, said driven gear comprising a portion of said rotatable part, and
   coarse drive means connected to said rotatable part independently of said fine drive means for rotating said rotatable part in a coarser manner than said fine drive means when said fine drive means is disconnected from said rotary part.

2. Apparatus comprising:
   a linearly reciprocable actuator,
   a rotatable part comprising a spindle threadedly connected to said actuator, said actuator being restrained against rotation to produce linear movement of said actuator in response to rotation of said rotatable part,
   fine drive means operably connectable to said rotatable part for rotating said rotatable part with precision movement, said fine drive means being disconnectable from said rotatable part to permit the latter to be rotatable independently of said fine drive means, and
   coarse drive means connected directly to said spindle independently of said fine drive means for rotating said rotatable part in a coarser manner than said fine drive means when said fine drive means is disconnected from said rotary part.

3. Apparatus comprising:
   a linearly reciprocable actuator,
   a rotatable part comprising a spindle threadedly connected to said actuator, said actuator being restrained against rotation to produce linear movement of said actuator in response to rotation of said rotatable part,
   fine drive means operably connectable to said rotatable part for rotating said rotatable part with precision movement, said fine drive means being disconnectable from said rotatable part to permit the latter to be rotatable independently of said fine drive means, and
   coarse drive means connected to said rotatable part independently of said fine drive means for rotating said rotatable part in a coarser manner than said fine drive means when said fine drive means is disconnected from said rotary part, said rotatable part including a driven gear fixed to said spindle, said fine drive means including a drive gear mounted within said driven gear and including external gear teeth engageable with internal gear teeth of said driven gear, said driven gear being rotatable about an axis which coincides with the axis of rotation of said spindle.

4. Apparatus according to claim 3, wherein said spindle includes an extension projecting coaxially through said driven and drive gears, said coarse drive means being connected to said extension of said spindle.

* * * * *